United States Patent
Hershey et al.

(10) Patent No.: US 7,262,729 B1
(45) Date of Patent: Aug. 28, 2007

(54) RADIO DETECTION AND RANGING INTRUSION DETECTION SYSTEM

(75) Inventors: John Erik Hershey, Ballston Lake, NY (US); Ralph Thomas Hoctor, Saratoga Springs, NY (US); David Michael Davenport, Niskayuna, NY (US); Jeffrey Michael Ashe, Gloversville, NY (US); Richard Louis Frey, Delanson, NY (US); Kenneth Brakeley Welles, Scotia, NY (US); V. Paul Staudinger, Niskayuna, NY (US); Harold W. Tomlinson, Jr., Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/455,883

(22) Filed: Jun. 19, 2006

(51) Int. Cl.
*G01S 13/56* (2006.01)
*G01S 13/04* (2006.01)
*G01S 13/00* (2006.01)

(52) U.S. Cl. ............ 342/28; 342/27; 342/147; 342/149; 342/157; 342/158; 342/175; 342/188; 342/195; 342/361; 342/362; 342/363; 342/365

(58) Field of Classification Search ........ 375/130–153; 342/27, 28, 82–103, 175, 188, 192–197, 342/361–366, 74, 75, 80, 147–158, 378–384, 342/124, 368–377, 118
See application file for complete search history.

(56) References Cited

U.S. PATENT DOCUMENTS

| | | | | |
|---|---|---|---|---|
| 3,421,091 A | * | 1/1969 | Brown et al. ............. | 342/363 |
| 3,795,005 A | * | 2/1974 | Monser et al. ............ | 342/371 |
| 4,079,361 A | * | 3/1978 | Woode ..................... | 342/27 |
| 4,106,015 A | * | 8/1978 | Beguin et al. ............ | 342/89 |
| 4,156,874 A | * | 5/1979 | Kopis ...................... | 342/188 |
| 4,191,953 A | * | 3/1980 | Woode ..................... | 342/188 |
| 4,308,541 A | * | 12/1981 | Frosch et al. ............ | 342/363 |
| 4,309,706 A | * | 1/1982 | Mosko ..................... | 342/363 |
| 4,691,205 A | * | 9/1987 | Profera, Jr. .............. | 342/365 |
| 4,811,020 A | * | 3/1989 | Montheil .................. | 342/188 |
| 4,881,077 A | * | 11/1989 | Jehle et al. .............. | 342/188 |
| 5,038,150 A | * | 8/1991 | Bains ....................... | 342/188 |
| 5,258,762 A | * | 11/1993 | Cabon et al. ............. | 342/188 |

(Continued)

FOREIGN PATENT DOCUMENTS

JP 06118165 A * 4/1994

*Primary Examiner*—Bernarr E. Gregory
(74) *Attorney, Agent, or Firm*—William E. Powell, III; Curtis B. Brueske

(57) ABSTRACT

A radar system having a processor, a waveform generator, a plurality of antenna interfaces, a set of first antennas configured to transmit a waveform, and a set of second antennas configured to receive a reflected waveform is disclosed. The waveform generator and antenna interfaces are in control and signal communication with the processor, each of the first antennas are in signal communication with one of each antenna interface, and each of the second antennas are in signal communication with one of each antenna interface. The waveform generator is in control and signal communication with each antenna interface, and is configurable to generate a waveform conforming to at least two ISM bands. Each first antenna is configured to transmit a circularly polarized electromagnetic waveform, and each second antenna is configured to receive a reflected circularly polarized electromagnetic waveform complementary to the first antennas.

16 Claims, 1 Drawing Sheet

U.S. PATENT DOCUMENTS

| | | | |
|---|---|---|---|
| 5,280,286 A * | 1/1994 | Williamson | 342/364 |
| 5,434,575 A * | 7/1995 | Jelinek et al. | 342/365 |
| 5,629,706 A * | 5/1997 | Båth | 342/124 |
| 6,677,887 B2 | 1/2004 | Harman | 342/28 |
| 6,987,481 B2 * | 1/2006 | Fehrenbach et al. | 342/124 |
| 7,196,654 B2 * | 3/2007 | Edwards et al. | 342/188 |
| 2004/0212529 A1 * | 10/2004 | Fehrenbach et al. | 342/124 |

* cited by examiner

RADIO DETECTION AND RANGING INTRUSION DETECTION SYSTEM

BACKGROUND OF THE INVENTION

The present disclosure relates generally to intrusion detection systems, and particularly to radio detection and ranging (RADAR) intrusion detection systems.

There is a need for security devices to monitor areas subject to penetration by trespassers and also to alert authorities when personnel have entered a hazardous zone. One commonly employed technique is that of electromagnetic RADAR. It is well known in the art that a RADAR system may be used to monitor an area even though there is no direct visible line of sight from the RADAR unit to the area under surveillance, as a RADAR signal may often successfully penetrate and return through common building materials, thereby allowing the RADAR unit to be hidden or inconspicuous.

For an electromagnetic emitter such as a RADAR unit, it is important to select an appropriate frequency band for operation. There are many bands that may be used but most of them require a license for operation. Bands that do not require a license, providing that radiation limits comport to regulations, are known as the Industrial, Scientific, and Medical, or ISM bands. These bands allow unlicensed electromagnetic radiation across a number of relatively wide spectrum bands. In the United States three of these bands are from 902-928 MHz, 2400-2483.5 MHz (also herein referred to as the 2.4 GHz band), and 5725-5850 MHz (also herein referred to the 5.8 GHz band).

One complication in using the ISM bands is that the user may interfere with other users, or be interfered with by other users. It is common that some of the ISM spectrum that may be used to support surveillance RADAR may also be used for an office local area network (LAN), for example. The use of RADAR may interfere with the LAN and severely impair the LAN's ability to transport data without error. Alternatively, the LAN may interfere with the surveillance RADAR's ability to detect intruders at the desired false alarm/missed detection receiver operating characteristic curve.

Building materials and the nature of the building construction may also pose serious operational problems so far as attenuation is concerned. Radiation in the ISM band from 2400-2438.5 MHz exhibits approximately the same amount of loss on propagation as radiation in the ISM band from 5727-5850 MHz through drywall but exhibits four to five decibels (dBs) less attenuation through cinder blocks.

There is therefore a need to devise surveillance RADAR systems that can more effectively function in light of these problems and shortcomings of the present systems in the art.

BRIEF DESCRIPTION OF THE INVENTION

An embodiment of the invention includes a radar system having a processor, a waveform generator, a plurality of antenna interfaces, a set of first antennas configured to transmit a waveform, and a set of second antennas configured to receive a reflected waveform. The waveform generator and antenna interfaces are in control and signal communication with the processor, each of the first antennas are in signal communication with one of each antenna interface, and each of the second antennas are in signal communication with one of each antenna interface. The waveform generator is in control and signal communication with each antenna interface, and is configurable to generate a waveform conforming to at least two ISM bands. Each first antenna is configured to transmit a circularly polarized electromagnetic waveform, and each second antenna is configured to receive a reflected circularly polarized electromagnetic waveform complementary to the first antennas.

BRIEF DESCRIPTION OF THE DRAWINGS

In the exemplary drawing of FIG. 1, a block schematic diagram of an exemplary RADAR system in accordance with an embodiment of the invention is depicted.

DETAILED DESCRIPTION OF THE INVENTION

Figure 1:
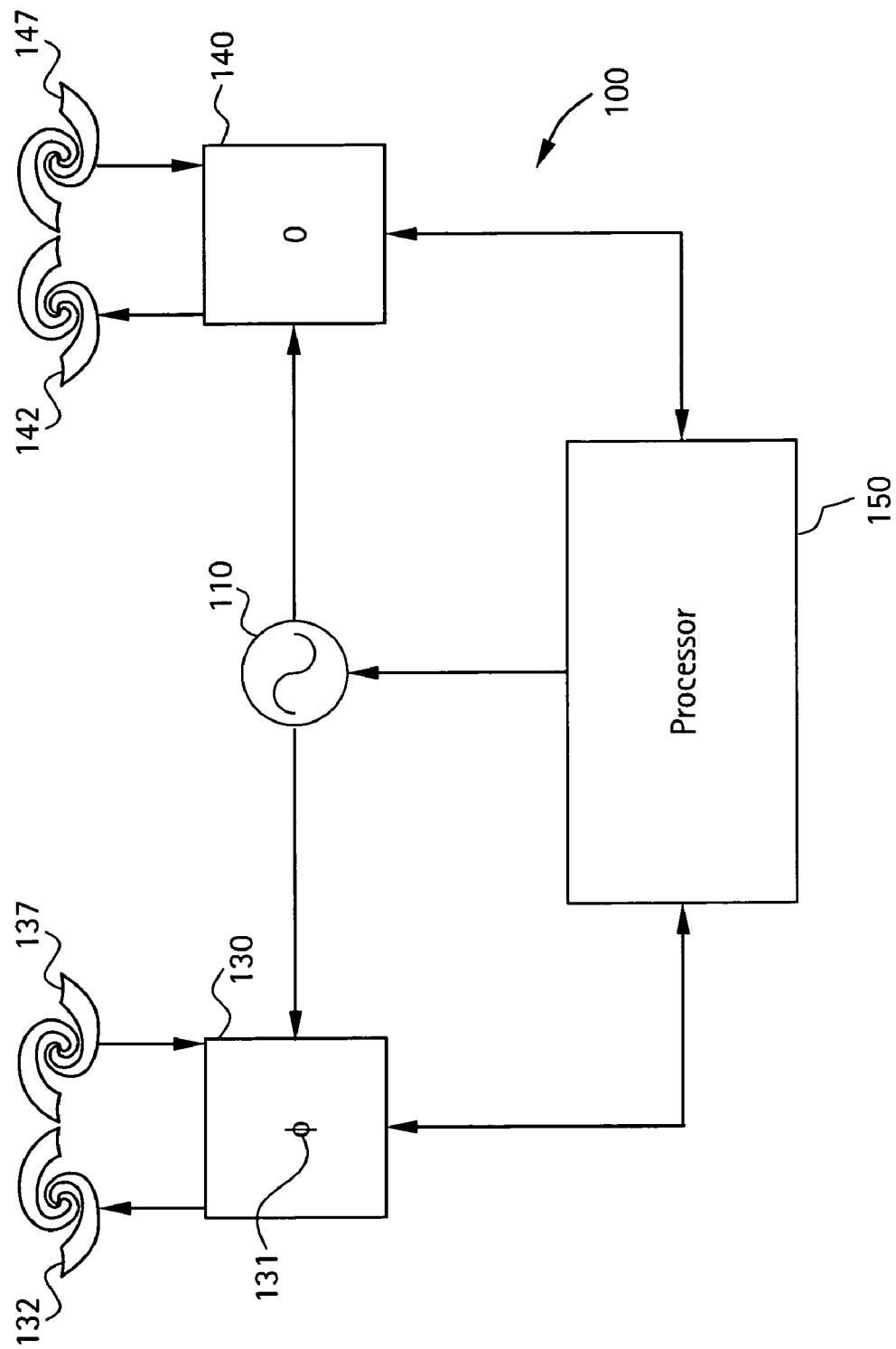

An embodiment of the invention provides a RADAR system that is capable of operating in two ISM bands and has an aperture consisting of a plurality of radiators that are individually controlled in phase in order to sweep a beam about a monitored area.

Referring now to FIG. 1, an exemplary embodiment of a RADAR system 100 is depicted. The system 100 includes a processor 150, a waveform generator 110, a plurality of antenna interfaces 130, 140, a set of first antennas (also herein referred to as transmit antennas) 132, 142, and a set of second antennas (also herein referred to as receive antennas) 137, 147. The waveform generator 110 and the antenna interfaces 130, 140 are each in control and signal communication with the processor 150. The set of first antennas 132, 142 are configured to transmit a waveform, and each of the first antennas 132, 142 are in signal communication with one of each antenna interface 130, 140. The set of second antennas 137, 147 are configured to receive a reflected waveform, and each of the second antennas 137, 147 are in signal communication with one of each antenna interface 130, 140.

While an embodiment of the invention has been described employing two antenna interfaces, it will be appreciated that the scope of the invention is not so limited, and that the invention may also apply to radar systems using other numbers of antenna interfaces, such as one, three, or more, for example. While an embodiment of the invention has been described employing one waveform generator, it will be appreciated that the scope of the invention is not so limited, and that the invention may also apply to radar systems using other numbers of waveform generators, such as one for each antenna interface, for example.

In an embodiment, the first antennas 132, 142 and the second antennas 137, 147 are broadband equiangular spiral antennas, configured to transmit and receive waveforms conforming to at least two ISM bands. An antenna is considered to be a broadband antenna if the impedance and the pattern of the antenna do not change significantly over an octave (fu/fl=2) or more, wherein fu and fl represent, respectively, the upper and lower frequencies of operation for which satisfactory performance is obtained. Equiangular spiral antennas provide operation independent of frequency.

In an embodiment, each first antenna 132, 142 is configured to transmit a circularly polarized electromagnetic waveform, which may be either right-hand circular or left-hand circular, and each second antenna 137, 147 is configured to receive a reflected circularly polarized electromagnetic waveform that is complementary, or of opposite polarization, to the first antennas 132, 142. The advantage of using circular polarization in this manner is twofold. First, circular polarization will gain a return from a target whose radar cross section exhibits a linear polarization. Second, the transmit 132, 142 and receive 137, 147 antennas will be highly isolated from each other, which will simplify the engineering necessary to reduce crosstalk between the transmit 132, 142 and receive 137, 147 antennas in order to receive and process a returned target signal.

In an embodiment, the processor 150 controls the waveform generator 110, which is configurable to generate waveforms at different ISM bands, such as a waveform conforming to at least two ISM bands, including the 2.4 GHz ISM band and the 5.8 GHz ISM band. The processor 150 also controls the duty cycle and amplitude of the waveform generator 110 and therefore the radar transmit waveform shape and duration.

While an embodiment of the invention has been described using the 2.4 GHz and 5.8 GHz ISM bands, it will be appreciated that the scope of the invention is not so limited, and that the invention will also apply to RADAR systems using other electromagnetic frequency bands, such as the 900 MHz ISM band, for example.

In an embodiment the antenna interface modules 130, 140 contain circuitry to match the transmitting antennas 132, 142 to the waveform generator 110. Additionally, the plurality of antenna interfaces 130, 140 comprises a first antenna interface 130 that comprises a phase shifter 131, signified by "$\phi$" that imposes a phase shift, $\phi$, in the signal path to the transmitting antenna 132. The processor 150 is configured to determine the appropriate phase, and control the phase shifter 131 to change the phase of the waveform generated by the waveform generator 110 and transmitted by the transmitting antenna 132. Antenna interface module 140 imposes no phase shift between the waveform generator 110 and the transmitting antenna 142, as signified by the "0" in the block representing antenna interface module 140. For the signals received on the receive antenna 137, the processor 150 is configured to control the phase shifter 131 to change the phase of the reflected waveform received by the second antenna 137 in signal communication with the first antenna interface 130. In another embodiment, the processor 150 is configured to control the phase shifter 131 to change both of: the phase of the waveform transmitted by the first antenna 132 in signal communication with the first antenna interface 130; and the reflected waveform received by the second antenna 137 in signal communication with the first antenna interface 130. In another embodiment, the processor 150 is configured to directly change, via signal processing, the phase of the reflected waveform received by the second antenna 137 in signal communication with the first antenna interface 130.

While an embodiment of the invention has been described utilizing only one phase shifter, it will be appreciated that the scope of the invention is not so limited, and that the invention also applies to radar systems using additional phase shifters, such as one per each antenna interface module, for example.

In an embodiment, the phase of each of the first antennas 132, 142 and the second antennas 137, 147 are individually controlled with respect to the waveform generated by the waveform generator 110 to sweep the waveform about a monitored area. The transmitted, or radiated, radar signal is the sum of the signals radiated from the two transmitting antennas 132, 142. This signal may be at maximum power in a single angular direction or at maximum power in a number of different angles. In an embodiment, by changing the phase $\phi$, the processor 150 can change the angle or angles of the maximum radiated power. This feature is useful for searching for an intruder, as the returned signal from the intruder will be larger if the power of the transmitted signal in the direction of the intruder is larger. This can also be used to steer a null of the transmitted electromagnetic radiation towards a debilitating signal source.

In an embodiment, the radar system 100 can be operated in a mode that uses just one of the plurality of the ISM frequency bands. The processor 150 is configured to allow user selection of one of the at least two ISM bands. Additionally, the processor 150 is configured to allow user selection of a portion of one of the at least two ISM bands. The operator or installer may select a band, or portion of a band, that has relatively little ambient energy. Accordingly, an embodiment of the radar system 100 does not disturb other ISM band users, nor do other ISM band users disturb it. This feature provides a significant advantage, allowing the radar system 100 to be integrated into an electromagnetic environment serving other ISM users, such as Local Area Networks (LANs), for example.

In an embodiment, in response to detection of a defined signal threshold, the processor 150 is configured to switch from one of the at least two ISM bands, such as the 2.4 GHz band, to another, such as the 5.8 GHz band. The defined signal threshold may represent a suspicious return, or a return that exceeds a predetermined threshold value. Generally, the 5.8 GHz band will allow angular target localization with better precision than the 2.4 GHz band. Such switching between bands as described above is known as sequential testing. Sequential testing is expected to yield other advantages, such as allowing lower duty cycles in both bands, and generating less interference, for example.

In an embodiment, the modulation of the carrier may be a simple sine wave, or be a more complex waveform. In an embodiment, the waveform generated by the waveform generator 110 comprises spectral spreading in order to make better use of the entire ISM bandwidth. In an embodiment, the processor is configured to employ signal processing using at least one of any general and efficacious target searching techniques. Examples of such techniques, for illustration and not limitation, include monopulse techniques, Doppler techniques, and pulse-to-pulse integration techniques. In an embodiment, the processor 150 is configured to cause phase shifting of the reflected waveforms received on the set of second antennas 137, 147, and to subsequently combine the shifted waveforms. Such a technique may be known as beam forming, and allows the processor 150 to be most sensitive to signals returning from the angle or angles of maximum radiated power.

An embodiment of the multimode intrusion detection RADAR system 100 may be set to operate within one or a plurality of the unlicensed ISM bands. This feature provides a significant advantage as the RADAR system 100 may be more easily integrated into an electromagnetic environment serving other ISM users. The operator or installer may select a band, or range of a band, that is relatively quiet and does not disturb other users nor is it disturbed by other users. Another advantage that may be provided by an embodiment of the multimode intrusion detection RADAR system 100 is that it uses a circularly polarized transmit waveform and receives returns on the complementary circular polarization. This provides a natural electromagnetic isolation between the transmit and receive portions of the RADAR transceiver. The circular polarized transmit signal also guarantees a return from a target whose radar cross-section is strongly linearly polarized. Additionally, an embodiment of the RADAR system 100 may also provide the advantage of the ability to move the maximum radiated power over different angles by the provisioning of two or more transmit antennas 132, 142 and two or more receiving antennas 137, 147. This can also be used to steer a null towards a debilitating signal source.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A radar system comprising:
a processor;
a waveform generator in control and signal communication with the processor;
a plurality of antenna interfaces, each interface in control and signal communication with the processor and the waveform generator;
a set of first antennas for transmitting a waveform, each of the first antennas in signal communication with one of each antenna interface; and
a set of second antennas for receiving a reflected waveform, each of the second antennas in signal communication with one of each antenna interface;
wherein the waveform generator generates a waveform conforming to frequencies of at least two ISM bands;
wherein each first antenna transmits a circularly polarized electromagnetic waveform; and
wherein each second antenna receives a reflected circularly polarized electromagnetic waveform complementary to the first antennas.

2. The radar system of claim 1, wherein:
the at least two ISM bands comprise a 2.4 GHz band and a 5.8 GHz band.

3. The radar system of claim 2, wherein:
in response to detection of a signal having a defined threshold, the processor is a device for switching from the 2.4 GHz ISM band to the 5.8 GHz ISM band.

4. The radar system of claim 1, wherein:
the set of first antennas and the set of second antennas are broadband equiangular spiral antennas for transmitting and receiving waveforms conforming to the at least two ISM bands.

5. The radar system of claim 1, wherein:
the plurality of antenna interfaces comprises a first antenna interface that comprises a phase shifter.

6. The radar system of claim 5, wherein:
the processor is a device for controlling the phase shifter to change a phase of the waveform generated by the waveform generator and transmitted by the first antenna in signal communication with the first antenna interface.

7. The radar system of claim 5, wherein:
the processor is a device for controlling the phase shifter to change a phase of the reflected waveform received by the second antenna in signal communication with the first antenna interface.

8. The radar system of claim 5, wherein:
the processor is a device for controlling the phase shifter to change a phase of both of the following:
the waveform generated by the waveform generator and transmitted by the first antenna in signal communication with the first antenna interface; and,
the reflected waveform received by the second antenna in signal communication with the first antenna interface.

9. The radar system of claim 5, wherein:
the processor is a device for directly changing, via signal processing, a phase of the reflected waveform received by the second antenna in signal communication with the first antenna interface.

10. The radar system of claim 1, wherein:
the processor is a device for allowing user selection of one of the at least two ISM bands.

11. The radar system of claim 10, wherein:
the processor is a device for allowing user selection of a portion of one of the at least two ISM bands.

12. The radar system of claim 1, wherein:
in response to detection of a signal having a defined threshold, the processor is a device for switching from one of the at least two ISM bands to another.

13. The radar system of claim 1, wherein:
the waveform generated by the waveform generator is generated by means of spectral spreading.

14. The radar system of claim 1, wherein:
the processor is a device for employing signal processing using at least one of:
monopulse techniques;
Doppler techniques; and
pulse to pulse integration techniques.

15. The radar system of claim 1, wherein:
the processor is a device for causing phase shifting of the reflected waveforms received on the set of second antennas, and to subsequently combine the shifted waveforms.

16. The radar system of claim 1, wherein:
a phase of each of the first and second antennas are individually controlled with respect to the waveform generated by the waveform generator, thereby sweeping the waveform about a monitored area.

* * * * *